(12) United States Patent
Le Bris et al.

(10) Patent No.: US 8,501,289 B2
(45) Date of Patent: *Aug. 6, 2013

(54) COOKING ITEM COMPRISING A NON-STICK COATING WITH IMPROVED PROPERTIES OF ADHESION TO THE SUBSTRATE

(75) Inventors: Stéphanie Le Bris, Challes les Eaux (FR); Aurélien Dubanchet, Gresy sur Aix (FR); Jean-Luc Perillon, Saint Paul Trois Chateaux (FR)

(73) Assignee: SEB SA, Ecully (FR)

( * ) Notice: Subject to any disclaimer, the term of this patent is extended or adjusted under 35 U.S.C. 154(b) by 72 days.

This patent is subject to a terminal disclaimer.

(21) Appl. No.: 12/997,569

(22) PCT Filed: Oct. 16, 2009

(86) PCT No.: PCT/FR2009/051979
§ 371 (c)(1),
(2), (4) Date: Apr. 11, 2011

(87) PCT Pub. No.: WO2010/043826
PCT Pub. Date: Apr. 22, 2010

(65) Prior Publication Data
US 2011/0180546 A1    Jul. 28, 2011

(30) Foreign Application Priority Data

Oct. 16, 2008 (FR) ...................... 08 57049

(51) Int. Cl.
| B32B 1/00 | (2006.01) |
| B32B 1/04 | (2006.01) |
| B32B 1/08 | (2006.01) |
| A47G 19/22 | (2006.01) |
| A47J 27/00 | (2006.01) |
| A47J 36/00 | (2006.01) |
| A47J 36/02 | (2006.01) |
| A47J 36/04 | (2006.01) |
| A47J 37/01 | (2006.01) |

(52) U.S. Cl.
USPC ....... 428/34.6; 428/34.4; 428/34.7; 428/35.8; 428/35.9; 428/36.4; 220/573.2

(58) Field of Classification Search
USPC ............... 428/34.1, 34.4–34.7, 35.7–35.9, 428/36.4, 148, 149; 220/573.2
See application file for complete search history.

(56) References Cited

U.S. PATENT DOCUMENTS 3,108,170 A   10/1963 Murphy
3,473,952 A   10/1969 McFadden
(Continued)

FOREIGN PATENT DOCUMENTS

DE   7200907   8/1972
DE   2827461   1/1980
(Continued)

OTHER PUBLICATIONS

Sun et al., "Frame Synchronization and Pilot Structure for Second Generation DVB via Satellites", Int'l J. Satellite Comm., 22(3): 319-339. 2004.

(Continued)

Primary Examiner — Walter B Aughenbaugh
(74) Attorney, Agent, or Firm — Patterson Thuente Pedersen, P.A.

(57) ABSTRACT

The present invention relates to a cooking item comprising a vitreous coating with improved impact-resistance properties. The present invention also relates to a method for manufacturing such an item.

11 Claims, 4 Drawing Sheets

U.S. PATENT DOCUMENTS

| | | | |
|---|---|---|---|
| 3,534,148 | A | 10/1970 | Bange |
| 3,663,793 | A | 5/1972 | Petro et al. |
| 3,934,748 | A | 1/1976 | Racz |
| 4,959,256 | A | 9/1990 | Piera |
| 5,037,675 | A | 8/1991 | Kishi et al. |
| 5,309,154 | A | 5/1994 | Mun et al. |
| 5,536,583 | A | 7/1996 | Roberts et al. |
| 6,238,847 | B1 | 5/2001 | Axtell, III et al. |
| 6,612,498 | B1 | 9/2003 | Lipponen et al. |
| 7,241,131 | B1 | 7/2007 | Booth et al. |
| 2002/0179329 | A1 | 12/2002 | Fukuoka et al. |
| 2003/0059600 | A1 | 3/2003 | Gazo et al. |
| 2003/0138661 | A1 | 7/2003 | Souchard et al. |
| 2005/0036809 | A1 | 2/2005 | Fukita et al. |
| 2006/0176984 | A1 | 8/2006 | Lee et al. |
| 2007/0218297 | A1 | 9/2007 | Jeon et al. |
| 2008/0237241 | A1 | 10/2008 | Buffard et al. |
| 2008/0290088 | A1 | 11/2008 | Leboeuf et al. |
| 2009/0004434 | A1 | 1/2009 | Parent et al. |
| 2009/0099287 | A1 | 4/2009 | Gier et al. |
| 2009/0161788 | A1 | 6/2009 | Giraud et al. |
| 2010/0003537 | A1 | 1/2010 | Akarsu et al. |
| 2011/0174826 | A1 | 7/2011 | Le Bris et al. |
| 2011/0192850 | A1 | 8/2011 | Le Bris et al. |
| 2011/0198358 | A1 | 8/2011 | Parent et al. |
| 2011/0308989 | A1 | 12/2011 | Berrux et al. |

FOREIGN PATENT DOCUMENTS

| | | |
|---|---|---|
| DE | 10059487 | 6/2002 |
| DE | 20319024 | 3/2004 |
| EP | 0285161 | 10/1988 |
| EP | 0323349 | 7/1989 |
| EP | 0515705 | 12/1992 |
| EP | 0580557 | 1/1994 |
| EP | 1835002 | 9/2007 |
| FR | 1536889 | 8/1968 |
| FR | 2275103 | 1/1976 |
| FR | 2575422 | 7/1986 |
| FR | 2576038 | 7/1986 |
| FR | 2622600 | 5/1989 |
| FR | 2625494 | 7/1989 |
| FR | 2882240 | 8/2006 |
| GB | 926001 | 5/1963 |
| GB | 926002 | 5/1963 |
| GB | 1159390 | 7/1969 |
| GB | 2169282 | 7/1986 |
| JP | 2-279574 | 11/1990 |
| WO | WO99/16625 | 4/1999 |
| WO | WO00/22395 | 4/2000 |
| WO | WO00/56537 | 9/2000 |
| WO | WO2004/049761 | 6/2004 |

OTHER PUBLICATIONS

Digital Video Broadcasting (DVB), "Second Generation Framing Structure, Channel Coding and Modulation Systems for Broadcasting, Interactive Services, News Gathering and Other Broadband Satellite Applications," ETSI Standards, European Telecommunications Standards Institute, Sophia-Antipo, France, V111:1-74 (Jun. 2004).

Digital Video Broadcasting (DVB), "User Guidelines for the Second Generation System for Broadcasting, Interactive Services, News Gathering and Other Broadband Satellite Applications (DVB-S2); ETSI TR 102 376," ETSI Standards, European Telecommunications Standards Institute, Sophia-Antipo, France, BC(V111) (Feb. 2005).

Duverdier et al., "DVB Par Satellite: De La Diffusion A L'Interactivite DVB by Satellite: From Broadcasting to Interactivity,"Revue Generale De L'Electricite Et De L'Electronique, Revue Generale De L'Electricite S.A., France, 4:42-47 (Apr. 2005).

Guoqing, "A New Frequency Estimator of Single Sinusoid Based on Fitz's Algorithm," Signal Processing, Proceedings ICSP '04; 2004 7$^{th}$ Int'l Conf. Beijing, China (Aug. 31-Sep. 4, 2004); pp. 1790-1793 (Aug. 2004).

Bian et al., "An Improved Fitz Carrier Frequency Offset Estimation Algorithm," Communication Technology Proceedings, ICCT 2003, Piscataway, NJ; IEEE 2:778-781 (Apr. 2003).

Randau et al., "Enamels and Enamelling", 1900. Scott Greenwood and Company. pp. 142-144.

Application and File History of U.S. Appl. No. 12/163,289, filed Jun. 27, 2008, inventors Parent et al.

Application and File History of U.S. Appl. No. 12/083,490, filed Sep. 16, 2008, inventors Giraud et al.

Application and File History of U.S. Appl. No. 13/000,888, filed Apr. 4, 2011, inventors Le Bris et al.

Application and File History of U.S. Appl. No. 13/000,906, filed Apr. 25, 2011, inventors Le Bris et al.

Application and File History of U.S. Appl. No. 12/997,574, filed Apr. 4, 2011, inventors Parent et al.

French Search Report for FR0403291 dated Nov. 5, 2004.

French Search Report for FR0406380 dated Sep. 27, 2004.

International Search Report and Written Opinion for PCT/FR2005/000775 dated Aug. 12, 2005.

International Search Report for International Application No. PCT/FR2005/001365 dated Nov. 22, 2005.

International Search Report for International Application No. PCT/FR2006/002313 dated Feb. 8, 2007.

International Search Report for International Application No. PCT/IB2009/007973 dated Sep. 9, 2010.

Application and File History for U.S. Appl. No. 10/594,378, filed Jan. 29, 2008, inventors Buffard et al.

Application and File History for U.S. Appl. No. 11/629,231, filed May 14, 2008, inventors Leboeuf et al.

Application and File History for U.S. Appl. No. 13/142,137, filed Sep. 9, 2011, inventors Berrux et al.

COOKING ITEM COMPRISING A NON-STICK COATING WITH IMPROVED PROPERTIES OF ADHESION TO THE SUBSTRATE

PRIORITY CLAIM

The present application is a National Phase entry of PCT Application No. PCT/FR2009/051979, filed Oct. 16, 2009, which claims priority from French Application No. 0857049, filed Oct. 16, 2008, the disclosures of which are hereby incorporated by reference herein in their entirety.

TECHNICAL FIELD

The present invention relates generally to cookware having a non-stick coating, and more particularly to cookware including a non-stick coating of the vitreous type having improved substrate adhesion properties. The present invention also relates to a manufacturing process for such cookware.

BACKGROUND ART

As used herein, the term vitreous type coating means a coating that has the appearance of glass or enamel, which can be either organo-mineral or entirely mineral.

As used herein, the term organo-mineral vitreous coating means a coating made up of a material of the sol-gel type (i.e. obtained through the sol-gel route) whose lattice is essentially inorganic, but which includes organic groups, due in particular to the precursors used and the firing temperature of the coating.

As used herein, the term entirely mineral coating means a coating made up entirely of an inorganic material, free of any organic groups. Such a coating can also be obtained by the sol-gel route with a firing temperature of at least 400° C., or from precursors of the tetraethoxysilane (TEOS) type with a firing temperature that can be less than 400° C.

In the field of vitreous type non-stick coatings intended for cookware, sol-gel coatings are known, and in particular those obtained from metal alkoxides based on silica (silanes) or based on alumina (aluminates).

These coatings are now highly developed in the cookware field, because they make it possible to obtain colored coatings with especially good resistance to scratching and heat.

Such coatings, however, have limited adhesion to metal substrates, particularly to aluminium, stainless steel and cast iron substrates.

To overcome these problems, the person skilled in the art know to prepare the substrate's surface by chemical treatment (of the chemical etching type, for example) or mechanical treatment (by brushing or sandblasting, for example), or even a combination of these treatments.

Even when such treatments are implemented, however, the adhesion to the substrate of the non-stick coating remains limited, in particular when the non-stick coating is subjected to a mechanical deformation such as a shock or a perforation, for example to set a rivet or a mounting stud.

Thus, when cookware whose bottom has an inner face coated with a sol-gel type non-stick coating is subjected to powerful shocks, marring under impact is observed which is accompanied by radially propagating cracks, even if the bottom's inner face has been previously sandblasted or brushed.

It follows that considerable precautions must be taken during manufacture of such cookware, which is manifested by high reject rates and low production speeds.

SUMMARY OF THE INVENTION

To overcome these problems of limited adhesion encountered in sol-gel type vitreous coatings, the applicant has discovered in a striking fashion that reinforcement of the inner face of the bottom of the cookware with a discontinuous hard base of a metallic or ceramic material enables a significant improvement in the adhesion of the non-stick coating to metal substrates (particularly of stainless steel, aluminium and aluminium alloy), which manifests itself in particular by improved impact resistance of the non-stick coating.

As used herein, the term metallic material means a material consisting of a metallic element (aluminium or iron, for example), usually a good electrical and thermal conductor and electron donor, or a metal alloy, that is a material resulting from the mixing of a parent metal (predominant metal) and alloying elements, a stainless steel or an aluminium alloy for example.

As used herein, the term ceramic material means any inorganic, essentially non-metallic material.

As used herein, the term non-metallic means that the material has an inorganic lattice in which metallic elements such as aluminium may be found in very small quantities. Non-metallic inorganic materials of the glass or enamel type are not considered, for the purpose of the present invention, to be ceramic materials capable of constituting the hard base if these materials have a softening point lower than the melting point of the substrate.

For example, in the case of an aluminium or aluminium alloy substrate having a melting temperature of the order of 600° C., enamel that can be used within the scope of the present invention has a softening point of at least 600° C.

As used herein, the term impact resistance means the ability of the coating to resist a powerful shock.

Conversely, a coating having poor impact resistance shows, after a powerful shock (or an impact), marring under impact which is accompanied by radially propagating cracks. Adhesion in this area becomes so weak that simply scratching with the fingernail will allow a part of the coating to be removed whose size is in fact much greater than that of the impact itself.

In particular, an embodiment of the invention includes an article of cookware comprising a metallic substrate having a concave inner surface intended to be next to the food that is to be put into the cookware and an outside convex face intended to be oriented toward the heat source, said inner face being successively coated, starting at the substrate, with a hard base and a non-stick coating covering said hard base, characterized in that:

the hard base is a discontinuous layer of ceramic or metallic material, which occurs in the form of a superficial dispersion of solid drops of the material, which are homogeneously distributed on the inner face of the article, with an inner surface coverage of between 20% and 90%, and the non-stick coating is a vitreous type coating which occurs in the form of a continuous film having a thickness of at least 10 µm and made up of a sol-gel material comprising a matrix of at least one metal polyalkoxylate and at least 5% by weight, referred to the total coating weight, of at least one metal oxide dispersed within said matrix.

As used herein, the term superficial dispersion of solid drops of ceramic or metallic material means a layer of said material that is discontinuous and occurs in a divided state on a substrate (in this case, that of the cookware), the roughness of this coating being brought about by the solid drops of material.

As used herein, the term substrate coverage means the ratio, expressed as a percentage, of the substrate surface area actually covered by the superficial dispersion of drops of (ceramic or metallic) material to the total surface area of the substrate that can be covered by the hard base.

As metallic materials that can be used within the scope of the present invention to make up the discontinuous hard base, the steels, preferably stainless, aluminium or aluminium alloys, zinc, iron or copper are recommended.

As ceramic materials that can be used within the scope of the present invention to make up the discontinuous hard base, alumina (possibly with a small quantity of titanium oxide added), zirconia, and enamels and glasses with a softening point greater than or equal to the substrate's melting temperature are recommended.

It is noted that the presence of such a discontinuous hard base arranged between the substrate and the sol-gel type non-stick coating leads to a significant improvement in the impact resistance of the non-stick coating.

According to an embodiment of the present invention, the inner face of the substrate is previously sandblasted or brushed before the deposition of hard base 3.

Now as regards the coating covering the structured inner face, and in particular the sol-gel material constituting this coating, the matrix of this material can advantageously comprise condensation products of metal polyalkoxylates, for example one or more polyalkoxysilanes, an aluminate, a titanate, a zirconate, a vanadate, a borate and their mixtures.

Preferably, the matrix of the coating according to the invention comprises a polyalkoxysilane and/or an aluminate so as to constitute a mixed matrix.

In an embodiment of the invention, the matrix of the coating is grafted with one or several organic groups selected from among the $C_1$-$C_4$ alkyl groups and the phenyl groups. These groups are necessary for improving the hydrophobicity of the coating. In order to obtain better thermal stability in the coating, short chains are favored within the scope of the present invention.

Preferably, the matrix of the coating according to the invention is grafted with one or more methyl groups, which improve the hydrophobic character of the coating without impeding the formation of the inorganic lattice.

Besides the matrix of at least one metal polyalkoxylate, the vitreous coating according to the invention comprises at least 5% by weight, and preferably from 5 to 30% by weight, referred to the total coating weight, of at least one metal oxide, which is preferably finely dispersed within the matrix. This metal oxide occurs generally in colloidal form in the form of aggregates whose size is under one micron, or even 300 nm or 400 nm.

As colloidal metal oxides that can be used in the non-stick coating according to the invention can be mentioned silica, alumina, cerium oxide, zinc oxide, vanadium oxide and zirconium oxide. The preferred colloidal metal oxides are silica and alumina.

The presence of a metal oxide within the coating matrix according to the invention makes it possible to obtain a film of sufficient thickness, to with a thickness of at least 10 µm. If the thickness of the film is less than 10 µm, the mechanical strength of the film formed is insufficient.

Preferably, the film has a thickness of between 10 and 80 µm, or better between 30 and 50 µm so that the film thus formed is continuous, coherent and sufficient for absorbing the roughness of the substrate.

Advantageously, the sol-gel material constituting the non-stick coating may also comprise at least one silicone oil to improve the hydrophobic character of the coating surface, and particularly after a thermal attack such as singeing.

In fact, the metal polyalkoxylate has hydrophobic groups which are destroyed at high temperature during singeing. But this disappearance of the hydrophobic characteristic is momentary, because it is gradually compensated by the silicone oil trapped in the polyalkoxylate, whose migration to the surface favours the gradual rebuilding of the hydrophobic groups on the film's surface.

It is observed that with a coating according to the invention comprising at least 0.1% by weight of silicone oil, the reconstitution of the hydrophobic characteristic is sufficient when further cooking takes place. In fact, the value of the static contact angle $\Theta$ of a drop of water deposited on the coating of the invention is of the order of 20° after a thermal attack of the singeing type. This static contact angle value rises to at least 75° after a hydrophobic properties reconstitution process consisting of reheating to an ambient temperature of 200° C. over a period of at least 5 minutes, in other words when the utensil is again ready for cooking.

Preferably, the silicone oil represents 0.1 to 6% by weight, or better 0.3 to 5% by weight of the total weight of the coating (in the dry state). Below 0.1% by weight of silicone oil, the reconstitution of the hydrophobic groups that disappeared during singeing (600° C.) is less, the angle obtained being less than 62°.

More preferably, the sol-gel material of the coating according to the invention comprises 0.5 to 2% by weight of silicone oil referred to the total weight of the dry coating. In this case, the initial static contact angle $\Theta$ of a drop of water deposited on such a coating is 95°. This coating, after a thermal attack of the singeing type, has an angle of 20°. After a reconstitution process comprising at least one reheating step to an ambient temperature of 200° C. over a period of at least 5 minutes, the static contact angle becomes greater than 75° when the utensil is again ready for cooking.

The coating according to the invention may comprise a silicone oil or a mixture of silicone oils.

As silicone oils that are usable in the coating according to the invention, phenyl silicones, methyl-phenyl silicones and methyl silicones can be mentioned in particular.

If the coating according to the invention is to be used in contact with food, a food grade silicone oil will be preferred for selection, and in particular an oil selected from among the food grade methyl-phenyl silicones and methyl silicones.

As methyl-phenyl silicones, the non-food-grade oils marketed by the WACKER company under the commercial designation WACKER SILICONOL AP150 and by the DOW CORNING company under the commercial designation DOW CORNING 550 FLUID can be mentioned in particular, as well as the AR00 food grade oils marketed by the WACKER company. As methyl silicone oils, the oil marketed by the RHODIA company under the commercial designation RHODIA 47 V 350, the WACKER company's 200 fluid, or even the TEGO company's ZV 9207 oil may be mentioned in particular; these are food grade methyl silicone oils.

Preferably, a silicone oil selected from among those mentioned above, with a molecular weight of at least 1,000 g/mol, which is nonreactive and has a viscosity of between 20 and 2,000 mPa·s, will be used.

Advantageously, the sol-gel material of the coating according to the invention can additionally comprise fillers for improving the mechanical properties of the coating that is formed, and/or pigments, to give color to the coating. In addition, the presence of fillers and/or pigments also has a beneficial effect on the hardness of the film.

As fillers that can be used in the coating according to the invention, alumina, zirconia, mica, clays (such as montmorillonite, sepiolite, gypsite, kaolinite and laponite®) and zirconium phosphate can be mentioned in particular.

As pigments that can be used in the coating according to the invention, titanium dioxide, mixed copper-chromium-manganese oxides, iron oxides, carbon black, perylene red, aluminosilicates, metal flakes and in particular aluminium flakes may be particularly mentioned.

Preferably, the fillers and/or the pigments are in the form of flakes, which has the advantage of improving the hardness of the non-stick coating.

Preferably, the pigment and/or the fillers are of nanometer size, in order to improve their dispersion and their distribution within the coating, giving it great consistency in performance.

In one embodiment of a cookware article according to the invention, the substrate is a hollow shell of a cookware article, having a bottom and a side wall rising from said bottom.

The substrate of the cookware article according to the invention is advantageously made from a material chosen from among the metals, glass, and ceramics.

Metal substrates are recommended, and preferably substrates made of aluminium, anodized or not, of stainless steel, of cast iron, of iron or of copper. Also recommended are multilayer composite substrates, for example aluminium (or aluminium alloy)/stainless steel bilayer substrates and stainless steel/aluminium (or aluminium alloy)/stainless steel trilayer substrates.

As aluminium alloys eligible to be used for making the substrate of the cookware according to the invention, low-alloy aluminium alloys are recommended, and in particular:
"pure" aluminiums with 99% aluminium in the 1000 series, as for example the 1050, 1100, 1200 and 1350 alloys,
aluminium-manganese alloys in the 3000 series, as for example the 3003, 3004, 3105 and 3005 alloys,
aluminium-silicon alloys in the 4000 series,
aluminium-magnesium alloys in the 5000 series, as for example the 5005, 5050 and 5052 alloys, and
aluminium-silicon-magnesium alloys in the 6000 series, as for example the 6053, 6060, 6063, 6101 and 6951, and
aluminium-iron-silicon alloys in 8000 series, as for example the 8128 alloy.

Finally, an embodiment of the present invention includes a manufacturing process for cookware, characterized in that it comprises the following steps:
a) a step in which a substrate is provided that has the final shape of the cookware article, with a concave inner face intended to be on the side of the food which is to be put into said cookware and a convex outer face intended to be next to a heat source;
b) optionally, a step in which the inner face of the substrate is treated to obtain an treated inner face suited to the adhesion of a hard base onto the substrate;
c) a step for building a hard base adhering to said inner face of the substrate, whether previously treated or not;
d) a step for building a non-stick coating on said hard base formed in step c);
the process being characterized in that, in the process, step c), in which the hard base is built, comprises thermal spraying onto the inner face of the substrate, previously treated or not, of a material suited for spraying by a thermal spraying process, so as to form on the inner face of the substrate a superficial dispersion of drops of said material which adhere to the substrate, and characterized in that step d), in which the non-stick coating is made, comprises the following steps in succession:
d1) the preparation of a sol-gel composition (A+B) comprising at least one colloidal metal oxide and at least one precursor of the metal oxide type;
d2) the application to all or part of said hard base of at least one layer of the sol-gel composition (A+B) having a thickness of at least 20 µm in the wet state, then
d3) firing said sol-gel composition layer (A+B) to obtain a vitreous non-stick coating at least 10 µm thick.

For the purpose of this invention, the term thermal spraying means spraying fine particles of a solid powdered product, melted or softened, onto a surface, preferably previously prepared, by means of a heat source.

As materials suited for spraying using a thermal spraying process and usable within the scope of the present invention, ceramic materials and metallic materials are recommended.

In the case of a hard metal base, the metallic material can be sprayed in the form of melted droplets, advantageously derived from a metal wire heated in a flame or an electric arc (the so-called "arcspray" process).

The hard metal base can also be obtained by thermal spraying of a metallic material in the form of a flame-heated metal powder.

In the case of a hard ceramic base, the ceramic material can be sprayed in the form of a powder heated in a flame or with a plasma torch. In this case, it is not only possible to spray ceramics that are electrically conductive, but also ceramics which are not electrically conductive. If it is desired to spray ceramics using an electric arc process of the "arcspray" type, they must be electrically conductive, and if the contrary is true (electrically non-conductive ceramics) they must be surrounded by an electrically conductive sheath.

The process according to the invention has the advantage of not requiring heat treatment after the spraying of the material for making up the hard base, as would be the case for a hard base made of enamel obtained by firing an enamel slip.

As regards the creation of the sol-gel type non-stick coating, the A+B sol-gel composition is prepared as follows:
c1) preparation of an aqueous composition A comprising 5 to 30% by weight referred to the total weight of the aqueous composition A of at least one metal oxide, and 0 to 20% by weight referred to the weight of composition A of a solvent comprising at least one alcohol;
c2) preparation of a solution B comprising at least one precursor of the metal alkoxide type;
c3) mixing the metal alkoxide solution B with aqueous composition A to obtain a sol-gel composition (A+B) with 40 to 70% by weight of aqueous composition A referred to the weight of the sol-gel composition (A+B) in the dry state.

As regards more particularly the preparation of aqueous composition A, it is necessary to incorporate at least 5% by weight of at least one metal oxide referred to the total weight of composition A to form a film having a thickness after firing of at least 10 microns. If on the other hand there is more than 30% by weight referred to the weight of composition A, it is no longer stable.

The metal oxide of aqueous composition A is as defined above. It is preferably a colloidal metal oxide selected from among colloidal silica and/or colloidal alumina.

The presence of an alcohol-based solvent is optional, but has the advantage of improving the compatibility of aqueous composition A with metal alkoxide solution B.

It is, however, possible to work without a solvent, but in this case the selection of polyalkoxylates is limited to those having excellent compatibility with water. An excess of solvent (greater than 20%) is possible, but generates volatile organic compounds unnecessarily, which is not good for the environment.

By way of a solvent in aqueous composition A of the invention, it is preferable to use an oxygenated alcohol solvent or an ether-alcohol.

Aqueous composition A according to the invention can also comprise, in addition to the colloidal metal oxide, and if applicable the alcohol-based solvent, at least one silicone oil, which is preferably present in composition A in the amount of 0.05% to 3% by weight referred to the total weight of the composition.

With an aqueous composition A that comprises 0.5 to 2% by weight of silicone oil, a coating is obtained that shows regenerable hydrophobic properties within the scope of a culinary use process. The silicone oil of composition A is a food-grade silicone oil defined above.

Aqueous composition A of the invention can also comprise fillers and/or pigments, which are as defined above.

Aqueous composition A of the invention can further comprise pyrogenic silica which has the function of adjusting the viscosity of the sol-gel composition and/or the shine of the dry coating.

As regards the preparation of solution B, preference for use as a precursor is given to a metal alkoxide selected from the group made up of:
  precursors corresponding to the general formula $M_1(OR_1)_n$,
  precursors corresponding to the general formula $M_2(OR_2)_{(n-1)}R_2'$, and
  precursors corresponding to the general formula $M_3(OR_3)_{(n-2)}R_3'_2$, with:
    $R_1$, $R_2$, $R_3$ or $R_3'$ designating an alkyl group,
    $R_2'$ designating an alkyl or phenyl group,
    n being an integer corresponding to the maximum valence of metals $M_1$, $M_2$ or $M_3$,
    $M_1$, $M_2$ or $M_3$ designating a metal selected from among Si, Zr, Ti, Sn, Al, Ce, V, Nb, Hf, Mg or Ln.

Advantageously, the metal alkoxide of solution B is an alkoxysilane.

As alkoxysilanes usable in solution B of the process of the invention, methyltrimethoxysilane (MTMS), tetraethoxysilane (TEOS), methyltriethoxysilane (MTES), dimethyldimethoxysilane and their mixtures can be mentioned in particular.

Preferably, alkoxysilanes MTES and TEOS are used, because they have the advantage of not containing methoxy groups. Indeed, the hydrolysis of methoxy groups leads to the formation of methanol in the sol-gel formulation, which considering its toxic classification requires supplementary precautions during application. On the contrary, the hydrolysis of ethoxy groups generates only ethanol which has a more favorable classification, hence less constraining utilization provisions for the sol-gel coating.

According to an advantageous embodiment of the process of the invention, solution B can comprise a mixture of an alkoxysilane as defined above and an aluminium alkoxide.

The metal alkoxide type precursor of solution B is mixed with an organic, mineral or Lewis acid which constitutes 0.01 to 10% by weight of the total weight of solution B.

As acids that can be used for mixing with the metal alkoxide precursor, acetic acid, citric acid, ethyl aceto-acetate, hydrochloric acid or formic acid can be mentioned in particular.

The acids according to the invention that are preferred are the organic acids, and more particularly acetic acid and formic acid.

After the preparation of aqueous composition A and that of precursor solution B, they are mixed together to form a sol-gel composition (A+B). The respective quantities of each of the compositions A and B must be adjusted so that the quantity of colloidal silica in the sol-gel composition constitutes 5 to 30% by weight on a dry basis.

The sol-gel composition (A+B) of the invention can be applied to the substrate by spraying or by any other application means, such as by dipping, by swabbing, by brushing, by rolling, by spin-coating or by silkscreen. As regards a shaped object, spraying by means of a spray gun for example has the advantage of forming a homogeneous and continuous film which, after firing, forms a continuous, waterproof coating with a consistent thickness.

After application of the sol-gel composition (A+B) according to the invention, drying is generally carried out, preferably at 60° C. for 1 minute.

The nature of the non-stick coating changes in response to firing temperature, from an organo-mineral coating for a firing temperature of the order of 200° C. to an essentially mineral coating for higher firing temperatures.

For a firing temperature below 400° C., particularly between 180 and 350° C., the non-stick coating is an organo-mineral coating (unless the precursor is only a TEOS: in this case an essentially mineral coating would result, even at firing temperatures below 400° C.).

As a substrate that can be used to make the cookware according to the invention, a hollow shell as described earlier, having a bottom and a side wall rising from the bottom, can be used to advantage.

The substrate that is usable within the scope of the present invention could with advantage be made of a material selected from among the metals, glass and ceramics.

As metal substrates usable in the process according to the invention, substrates made of aluminium or aluminium alloy, anodized or not, of stainless steel, of cast iron, or even of copper may be mentioned with advantage. Composite multi-layer substrates may also be mentioned, bilayer aluminium (or aluminium alloy)/stainless steel and tri-layer stainless steel/aluminium (or aluminium alloy)/stainless steel substrates, for example.

The process according to the invention can also comprise a step in which a layer of enamel is deposited on the face opposite the one coated with a non-stick coating according to the invention, the enamel layer deposition step being carried out prior to that of the non-stick coating according to the invention.

In addition to the advantages mentioned above, the process conforming to the invention is particularly simple in implementation and can easily be planned for without disruption of the conventional cookware manufacturing processes.

BRIEF DESCRIPTION OF THE DRAWINGS

Other advantages and features of the present invention will result from the description that follows, given as a non-limiting example and done with reference to the annexed figures:

FIGS. 3, 5, 7, 9, 11 and 13 are views of the substrate obtained when the shock is carried out on the inner face having the non-stick coating (inside cupping test), while FIGS. 4, 6, 8, 10 and 12 are views of the substrate when the shock is carried out on the face opposite that provided with the non-stick coating (outside cupping test)

DETAILED DESCRIPTION OF THE DRAWINGS

Figure 1:
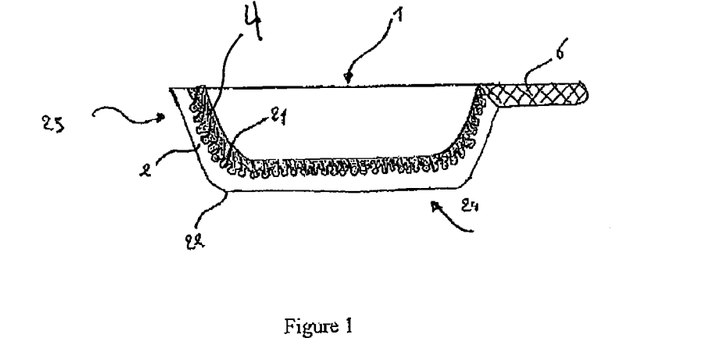
FIG. 1 is a schematic sectional view of a cookware article coated with a sol-gel type vitreous non-stick coating.
Figure 2:
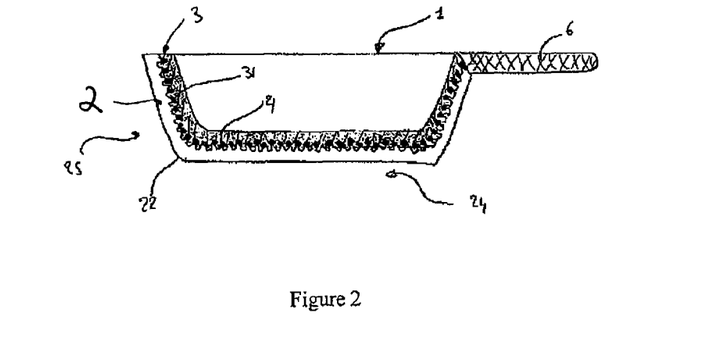
FIG. 2 is a schematic sectional view of a cookware article coated with a hand base and a vitreous non-stick coating.

Identical elements shown in FIGS. 1 and 2 are identified by identical reference numbers. Shown in these figures as an example of cookware according to the prior art is a pan 1 comprising a substrate 2 which takes the form of a hollow shell with a bottom 24 and a side wall 25 rising from the bottom 24, and a handle 6. Substrate 2 comprises an inner face 21 which can accommodate food and an outer face 22 to be on the side of the heat source, such as a hotplate or a burner.

FIG. 1 depicts a cookware article whose inner face 21 has been de-greased, then sandblasted. This sandblasted inner face 21 is coated with a sol-gel type vitreous non-stick coating 4 in conformity with the present invention.

FIG. 2 depicts a cookware article, in which the inner face 21, which was previously de-greased and sandblasted, is successively coated, starting at substrate 2, with a hard base 3 of stainless steel and with a vitreous non-stick coating 4.

Hard base 3 is a layer of stainless steel which is discontinuous and is made up of a superficial dispersion of steel drops 31, which are homogeneously distributed on the surface of inner face 21, with an inner surface coverage of between 20 and 90%. The steel drops 31, which are dispersed on the inner face 21, are embedded in the non-stick coating layer 4, so as to anchor non-stick coating 4 to hard base 3. Such a hard base 3 in the form of a superficial dispersion of steel drops makes it possible to significantly improve the adhesion of the non-stick coating 4 onto substrate 3, and impact resistance in particular.

An embodiment of a cookware article 1 in conformity with the invention is given hereafter, which comprises the following successive steps:

a) provision of a substrate having the final shape of the cookware article, with an inner face 21 intended to be arranged next to the food that is to be placed into said cookware 1, and an outer face 22 intended to be arranged on the side of a heat source;

b) a preparation step for the surface of the inner face 21 consisting of the degreasing of the surface followed by a mechanical treatment such as sandblasting or brushing;

c) creation of a hard base of stainless steel on the inner face 21 of substrate 2 by thermal spraying of the steel in the form of melted droplets, these droplets being derived from a stainless steel wire heated by an electric arc; then d) creation of a non-stick coating 4 on hard layer 3, formed in step c), by a sol-gel route in conformity with the process of the invention.

EXAMPLES

Products
Stainless steel
Sol-gel (A+B) Coating:
Aqueous Composition A
Colloidal metal oxide: colloidal silica in the form of an aqueous 30% silica solution, marketed by the Clariant company under the commercial designation Klebosol.
Solvent: isopropanol
Silicone oil: food grade methyl silicone oil marketed by the TEGO company under the commercial designation "TEGO ZV 9207."
Pigment: black mineral pigment marketed by the Ferro company under the commercial designation "FA 1260"
Solution B
Precursors:
methyltriethoxysilane (MTES) having the formula $Si(OCH_2CH_3)_3CH_3$,
methyltrimethoxysilane (MTMS) having the formula $Si(OCH_3)_3CH_3$,
Acid: acetic acid
Test
Impact Resistance of the Non-Stick Coating Evaluated Using the Erichsen Test in Compliance with the ISO 6272 Standard.

This is a shock test which involves dropping a 2 kg ball from a height of 50 cm. Small aluminium plates are used for the tests, one of whose faces is coated with a sol-gel type non-stick coating in conformity with the present invention. The plates are all identical to one another (in terms of thickness and the type of alloy) in order to have consistent deformation in all the tests.

This test comprises generating a shock directly on the non-stick coating deposited on the coated face of a plate (inside cupping test) and a shock on the face opposite the one coated with the non-stick coating on another plate (outside cupping test).

After the shocks are carried out, a visual examination is performed of the face coated with the non-stick coating.

Figure 3:
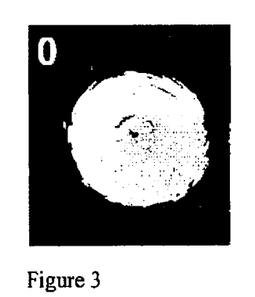
FIGS. 3 to 13 present a series of top views of a metal substrate coated with a non-stick coating after impact resistance tests of the non-stick coating according to the Erichsen test in compliance with the ISO 6272 standard; these views making up a visual evaluation scale for impact resistance.
Figure 4:
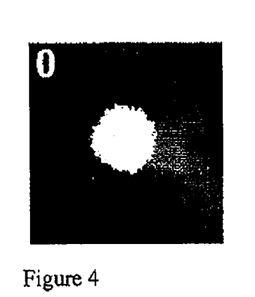
Figure 5:
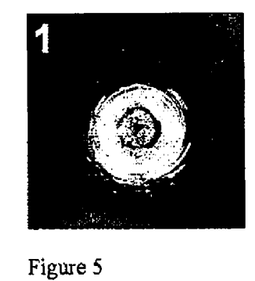
Figure 6:
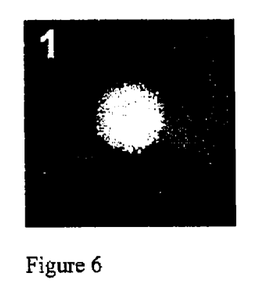
Figure 7:
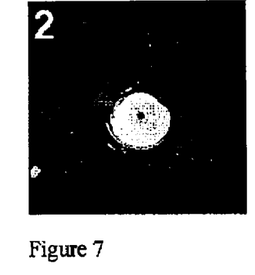
Figure 8:
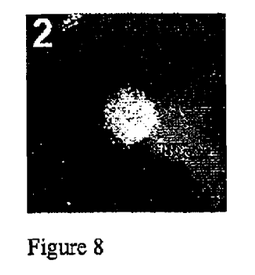
Figure 9:
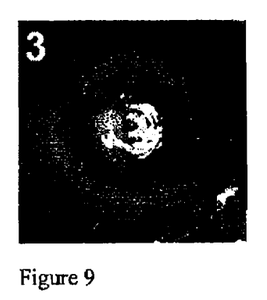
Figure 10:
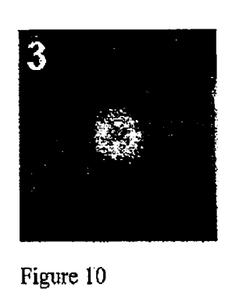
Figure 11:
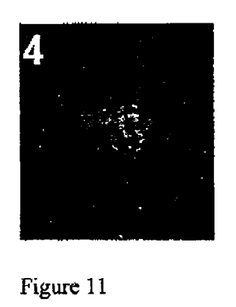
Figure 12:
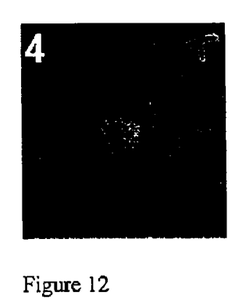
Figure 13:
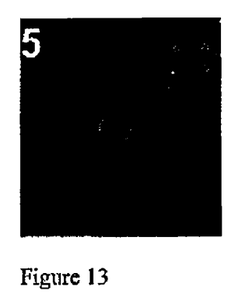

The impact resistance of the non-stick coating is estimated according to the following visual scale, which is based, on the one hand, on a shock applied directly on the non-stick coating (inside cupping test), and on the other hand on the face opposite the one coated with the non-stick coating (outside cupping test):

the grade of 0 is assigned upon observing:
for the inside cupping test:
at the impact point, complete delamination of the non-stick coating over the entire deformed area of the inner face manifested by the appearance of a "white" area at the impact point (corresponding to an uncoated portion of the metal surface), occurring as a disc having a diameter of the order of 25 mm, as illustrated in FIG. 3;
for the outside cupping test:
also a complete delamination of the non-stick coating over a large area of the deformed inner face, manifested by the appearance of a "white" area at the impact point (corresponding to an uncoated portion of the metal surface), occurring as a disc having a diameter of at least 10 mm, as illustrated in FIG. 4;
the grade of 1 is assigned upon observing:
for the inside cupping test:
at the impact point, nearly complete delamination of the non-stick coating over a large area of the deformed inner face, this delamination manifested by the appearance of a nearly "white" area at the impact point (corresponding to an uncoated portion of the metal surface), this zone occurring as a disc having a diameter of the order of 20 mm, as illustrated in FIG. 5;

for the outside cupping test:

a virtually complete delamination of the non-stick coating over a medium-sized area of the deformed inner face, manifested by the appearance of a "white" uncoated zone at the impact point, occurring in the form of a disc having a diameter of the order of 10 mm, as illustrated in FIG. 6;

the grade of 2 is assigned upon observing:

for the inside cupping test:

at the impact point, nearly complete delamination of the non-stick coating over a medium-sized area of the deformed inner face, manifested by the appearance of a "white" uncoated zone at the impact point, occurring in the form of a disc having a diameter of the order of 10 mm, as illustrated in FIG. 7;

for the outside cupping test:

at the impact point, a white zone in the form of a disc with a diameter less than 10 mm, in which are located large fragments extending to the metal surface of the substrate, with a relatively high fragment density, as illustrated in FIG. 8;

the grade of 3 is assigned upon observing:

for the inside cupping test:

at the impact point, a central zone in which are located large fragments exposing the metal, as illustrated in FIG. 9;

for the outside cupping test:

at the impact point, a white area in the shape of a disc whose diameter is less than 10 mm, and in which are located fine fragments extending to the metal with a medium relative density, as illustrated in FIG. 10;

the grade of 4 is assigned upon observing:

for the inside cupping test:

at the impact point, an area in the shape of a small-diameter disc, in which are located fine fragments extending to the metal with a rather low density, as illustrated in FIG. 11;

for the outside cupping test:

a few pinholes extending to the metal, which are localized in the impact area as illustrated in FIG. 12;

lastly, the grade of 5 is assigned upon observing:

for the inside cupping test:

at the impact point, a slight halo that is a little lighter than the non-stick coating, as illustrated in FIG. 13;

for the outside cupping test:

no change in the appearance of the non-stick coating (not illustrated in the visual scale used in the present application).

Example 1

Making a Non-stick Coating Composition R in Conformity with an Embodiment of the Present Invention.

For making a non-stick coating composition R in conformity with an embodiment of the invention, the following procedure is followed:

1.1) an aqueous composition A is prepared based on colloidal silica, in conformity with the process of an embodiment of the invention;

1.2) and 1.3) an MTES-based solution B is prepared, in conformity with the process of an embodiment of the invention;

1.4) and 1.5) a sol-gel composition (A+B) is prepared from aqueous composition A and solution B, in conformity with the process of an embodiment of the invention.

1.1: Preparation of an Aqueous Composition A Based on Colloidal Silica.

A colloidal silica-based aqueous composition A has been prepared, which is presented in Table 1:

TABLE 1

| Constituents of Part A | Quantity (g) |
| --- | --- |
| Aqueous 30% solution of colloidal silica: Klebosol | 42 |
| Water | 16 |
| Isopropanol | 8 |
| Black pigment FA 1220 | 33 |
| TEGO ZV 9207 Silicone oil | 1 |
| TOTAL | 100 |

1.2: Preparation of a Solution B, According to an Embodiment of the Invention, Based on MTES.

A solution B is prepared by mixing 59.4 g of MTES with 2.4 g of acetic acid, giving a 4% solution by weight of acid in the MTES.

1.3: Preparation of a Solution, According to an Embodiment of the Invention, Based on MTMS.

A solution B is prepared by mixing 59.4 g of MTMS with 0.6 g of acetic acid, giving a 1% solution by weight of acid in the MTMS.

1.4: Preparation of a First Sample Sol-gel Composition SG According to an Embodiment of the Invention (from MTES)

A first sol-gel composition SG according to the invention is made by adding, to 100 g of aqueous composition A according to the invention, 61.8 g of solution B from Example 1.2. Mixing is carried out in a planetary mixer for one hour, maintaining a temperature below 60° C., on completion of which a sol-gel composition SG according to an embodiment of the invention is obtained which is kept at ambient temperature. The composition SG is left to age for 24 hours at ambient temperature after mixing before being applied to a substrate.

1.5: Preparation of a Second Sample Sol-gel Composition SG According to an Embodiment of the Invention (from MTMS)

A second sol-gel composition SG according to an embodiment of the invention is made by adding, to 100 g of aqueous composition A according to the invention, 60 g of solution B from Example 1.3. Mixing is carried out in a planetary mixer for one hour while maintaining a temperature below 60° C., upon completion of which a sol-gel composition SG according to an embodiment of the invention is obtained which is kept at ambient temperature. The composition SG is left to age for 24 hours at ambient temperature after mixing before being applied to a substrate.

Example 2

Fabrication of a First Sample Cookware Article According to an Embodiment of the Invention: Sandblasted Substrate+ Hard Discontinuous Stainless Steel Base.

As a substrate, an aluminium shell obtained by stamping an aluminium (type 1200) disc is used, the shell thus formed having a bottom whose diameter is approximately 26 cm.

This shell is degreased by spraying with an alkaline solution, and the inner face of the bottom of the shell is sandblasted (with corundum).

Then stainless steel is sprayed in the form of melted droplets derived from a stainless steel wire heated by an electric arc according to the so-called "Arc spray" process.

Then, the non-stick coating R is made by applying onto hard base 3 the sol-gel composition SG from Example 1.4 (MTES-based), according to the following cycle:

application to the substrate of a first coat of sol-gel composition SG from Example 1.4, with a wet state thickness of 30 to 70, drying for one minute at 60° C., and cooling to ambient temperature.

This cycle is carried out twice.

Then the cookware thus coated is fired for 17 minutes at 270° C.

A cookware article is then obtained with a non-stick coating having a dry state thickness of the order of 35 microns (±5 μm) and which is smooth, black and shiny.

The cookware article according to an embodiment of the invention of Example 2 is shown in FIG. 2.

Example 3

Fabrication of a First Sample Control Cookware Article: Sandblasted Substrate without a Hard Base.

The substrate 2 that is used is the same as that of Example 2 (sandblasted substrate).

In this example, no discontinuous hard base is created on the inner face 21 of substrate 2. Consequently, non-stick coating 4 is built directly on inner face 21 of the substrate, previously degreased and sandblasted in the same way as in Example 2 (MTES-based sol-gel coating from Example 1.4).

The cookware article of Example 3 is shown in FIG. 1.

Example 4

Fabrication of a Second Sample Cookware Article According to an Embodiment of the Invention: Sandblasted Substrate+Discontinuous Stainless Steel Hard Base.

In this example, the procedure is the same as that in Example 2, except that the sol-gel coating used is that from Example 1.5 (MTES-based).

Example 5

Fabrication of a Second Sample Control Cookware Article: Sandblasted Substrate without a Hard Base.

In this example, the procedure is the same as in Example 3, except that the sol-gel coating used is that from Example 1.5 (MTMS-based).

Example 6

Erichsen Test

The impact resistance of the cookware article controls of Examples 3 and 5 (from MTES, shown in FIG. 1), and of the cookware articles according to embodiments of the invention of Examples 2 and 4 (from MTMS, shown in FIG. 2), is evaluated according to the Erichsen test.

The Erichsen test results obtained on the one hand with saucepans according to embodiments of the invention of Examples 2 and 4 (FIG. 2), and on the other hand with the control saucepans of Examples 3 and 5 (FIG. 1) are visual observations translated into a grade from 0 to 5 according to the visual scale described previously and illustrated in FIGS. 3 through 13, which are all to the same scale. These results are presented in Table 2 below.

TABLE 2

| | Erichsen test results: grading according to the visual scale (1-5) | |
|---|---|---|
| | Inside cupping test | Outside cupping test |
| Cookware article according to an embodiment of the invention (Example 2; FIG. 2) | 5 | 4 |
| Control cookware article (Example 3; FIG. 1) | 2 | 2 |
| Cookware article according to an embodiment of the invention (Example 4; FIG. 2) | 5 | 4 |
| Control cookware article (Example 5; FIG. 1) | 2 | 2 |

Figure 14:
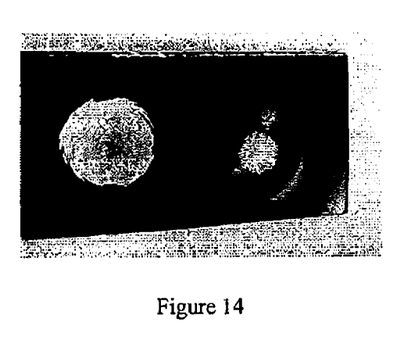
FIG. 14 shows a top view of the cookware article of FIG. 1 after the Erichsen test.

FIG. 14 depicts (in the same figure) the condition of the non-stick coating, on the one hand after an inside cupping test (left part of FIG. 14) and on the other hand after an outside cupping test (right part of FIG. 14) of a sandblasted metal substrate comprising a non-stick coating 4 without a hard base 3. FIG. 14 is a good match to FIGS. 7 and 8 of the visual scale (grade 2).

Figure 15:
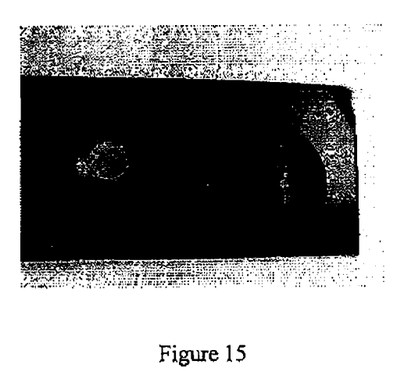
FIG. 15 shows a top view of the cookware article of FIG. 2 after the Erichsen test.

FIG. 15 depicts (in the same figure) the condition of the non-stick coating on the one hand after an inside cupping test (left part of FIG. 15) and on the other hand after an outside cupping test (right part of FIG. 15) of a sandblasted metal substrate coated successively with a hard base 3 and a non-stick coating 4, in conformity with an embodiment of the present invention. FIG. 15 is a good match to FIGS. 13 and 12.

The results shown in Table 2 and illustrated in FIGS. 14 and 15 show that the formation of a hard metal base on the surface of the inner face makes it possible to improve the substrate adhesion properties of a sol-gel type non-stick coating.

The invention claimed is:

1. A cookware comprising a metal substrate having a concave inner face intended to be arranged next to the food to be put into the cookware and a convex outer face intended to be arranged toward a heat source, said inner face being successively coated, starting at the metal substrate, with a hard base and a non-stick coating covering said hard base wherein, the hard base is a discontinuous layer of a ceramic or metallic material which occurs in the form of a superficial dispersion of drops of said material distributed homogeneously over the inner face of said metal substrate, with an inner face coverage of between 20% and 90%, and said non-stick coating is a vitreous type coating occurring in the form of a continuous film having a thickness of at least 10 μm and made up of a sol-gel material comprising a matrix of at least one metal polyalkoxylate and at least 5% by weight referred to the total weight of the coating of at least one metal oxide dispersed within said matrix.

2. The cookware according to claim 1, wherein the hard base is a discontinuous layer of stainless steel.

3. The cookware according to claim 1, wherein the hard base is a discontinuous layer of alumina or zirconia.

4. The cookware according to claim 1, wherein the inner face of the metal substrate is sandblasted or brushed.

5. The cookware according to claim 1, wherein the discontinuous hard base is made of a ceramic or metallic material which has a hardness greater than or equal to that of a metal or metal alloy constituting the metal substrate.

6. The cookware according to claim 1, wherein the metal polyalkoxylate is a polyalkoxysilane.

7. The cookware according to claim 1, wherein the metal polyalkoxylate is an aluminate.

8. The cookware according to claim 1, wherein the sol-gel material comprises a mixed matrix of polyalkoxysilane and aluminate.

9. The cookware according to claim 1, wherein the metal oxide is selected from within the group made up of silica, alumina, cerium oxide, zinc oxide, vanadium oxide and zirconium oxide.

10. The cookware according to claim 1, wherein the sol-gel material constituting said non-stick coating comprises additionally at least one silicone oil.

11. The cookware according to claim 10, wherein the silicone oil is selected from among the methyl-phenyl silicones and the methyl silicones.

* * * * *